(12) United States Patent
McGehee (10) Patent No.: US 10,068,403 B1
(45) Date of Patent: Sep. 4, 2018

(54) LOCKER MANAGEMENT TECHNIQUES

(71) Applicant: Universal City Studios LLC, Universal City, CA (US)

(72) Inventor: William V. McGehee, Maitland, FL (US)

(73) Assignee: UNIVERSAL CITY STUDIOS LLC, Universal City, CA (US)

( * ) Notice: Subject to any disclaimer, the term of this patent is extended or adjusted under 35 U.S.C. 154(b) by 0 days.

(21) Appl. No.: 15/711,614

(22) Filed: Sep. 21, 2017

(51) Int. Cl.
| | |
|---|---|
| G08C 19/00 | (2006.01) |
| G08C 17/02 | (2006.01) |
| G07C 9/00 | (2006.01) |
| G06T 11/60 | (2006.01) |
| G07F 17/12 | (2006.01) |
| H04N 7/18 | (2006.01) |
| G06Q 10/02 | (2012.01) |

(52) U.S. Cl.
CPC .......... *G07C 9/00912* (2013.01); *G06T 11/60* (2013.01); *G07C 9/00309* (2013.01); *G06Q 10/02* (2013.01); *G07F 17/12* (2013.01); *H04N 7/183* (2013.01)

(58) Field of Classification Search
CPC . G07C 9/00912; G07C 9/00309; G06T 11/60; G02B 2027/0138; G02B 2027/014; G02B 2027/0178; G02B 2027/0187; G02B 27/0172; G02C 11/04; G02C 11/10; G02C 5/143; G06F 21/35; G06F 3/011; G06F 3/012; G06F 3/016; G06F 3/017; G06F 3/0304
USPC ....................................................... 340/5.73
See application file for complete search history.

(56) References Cited

U.S. PATENT DOCUMENTS

| | | | |
|---|---|---|---|
| 7,605,714 B2 * | 10/2009 | Thompson | G08C 17/02 340/10.1 |
| 8,430,310 B1 | 4/2013 | Ho et al. | |
| 9,058,057 B2 * | 6/2015 | Matsuda | G06F 3/017 |
| 9,533,653 B2 * | 1/2017 | Daman | H04W 4/70 |
| 2014/0266604 A1 | 9/2014 | Masood et al. | |
| 2014/0361988 A1 | 12/2014 | Katz et al. | |

(Continued)

FOREIGN PATENT DOCUMENTS

| | | |
|---|---|---|
| KR | 20110126263 A | 11/2011 |
| WO | 2015085434 A1 | 6/2015 |

*Primary Examiner* — Yong Hang Jiang
(74) *Attorney, Agent, or Firm* — Fletcher Yoder, P.C.

(57) ABSTRACT

A locker system includes a locker area, a plurality of lockers positioned in the locker area, and a plurality of augmented reality headsets. Individual augmented headsets of the plurality of augmented reality headsets including a display and being configured to be worn by respective individual users. The locker system also includes a controller communicatively coupled to the plurality of lockers and the plurality of augmented reality headsets, wherein the controller comprises a memory and a processor configured to execute instructions stored on the memory. The instructions include generating locker assignments to assign individual lockers of the plurality of lockers to the respective individual users, communicating the locker assignments of the assigned individual lockers to the respective individual users using the plurality of augmented reality headsets, and controlling operation of the assigned individual lockers of the plurality of lockers based on signals received from the plurality of augmented reality headsets.

20 Claims, 6 Drawing Sheets

(56) References Cited

U.S. PATENT DOCUMENTS

2015/0369612 A1   12/2015  Nishimura et al.
2016/0259183 A1    9/2016  Rayner \* cited by examiner

LOCKER MANAGEMENT TECHNIQUES

FIELD OF DISCLOSURE

The present disclosure relates generally to locker management systems and methods. More specifically, embodiments of the present disclosure relate to systems and methods for assigning and enabling access to assigned or designated lockers.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks or similar entertainment facilities often include one or more locker systems, such that users (e.g., guests and personnel) may store their belongings in the lockers while at the amusement park. However, it may be time consuming to find or register for an available locker among a large number of lockers. It may also be burdensome to unlock/lock a locker while attending to other needs (e.g., carrying things, enjoying the amusement park). In addition, it may be challenging to efficiently provide suitable lockers to a large number of users seeking lockers at the same time. Accordingly, it would be desirable to provide efficient systems and methods for assigning and enabling access to assigned lockers.

SUMMARY

Certain embodiments commensurate in scope with the originally claimed subject matter are summarized below. These embodiments are not intended to limit the scope of the disclosure. Indeed, the present disclosure may encompass a variety of forms that may be similar to or different from the embodiments set forth below.

In accordance with one aspect of the present disclosure, a locker system includes a locker area and a plurality of lockers positioned in the locker area. The locker system includes a plurality of augmented reality headsets, individual augmented headsets of the plurality of augmented reality headsets including a display and being configured to be worn by respective individual users. The locker system also includes a controller communicatively coupled to the plurality of lockers and the plurality of augmented reality headsets, wherein the controller comprises a memory and a processor configured to execute instructions stored on the memory. The instructions include generating locker assignments to assign individual lockers of the plurality of lockers to the respective individual users, and communicating the locker assignments of the assigned individual lockers to the respective individual users using the plurality of augmented reality headsets. The instructions also include controlling operation of the assigned individual lockers of the plurality of lockers based on signals received from the plurality of augmented reality headsets of the respective individual users, wherein the signals are indicative of commands provided by the respective individual users and wherein the commands are sensed using the plurality of augmented reality headsets.

In accordance with another aspect of the present disclosure, a system includes a locker area, a plurality of lockers positioned in the locker area, a plurality of augmented reality headsets, and a controller communicatively coupled to the plurality of lockers and the plurality of augmented reality headsets. The controller is configured to determine assignments of the plurality of lockers based on one or more criteria and communicate the assignments to the respective plurality of augmented reality headsets. The assigned lockers of the plurality of lockers are configured to be locked and unlocked in response to instructions provided via the respective plurality of augmented reality headsets.

In accordance with another aspect of the present disclosure, a method of using a locker system includes receiving, via a controller, information from an augmented reality headset, wherein the information is about a user of the augmented reality headset in a locker area comprising a plurality of lockers. The method includes accessing information from sensors, via the controller, the information being indicative of locker availability among the plurality of lockers. The method includes communicating potential available locker assignments from the controller to the augmented reality headset worn by the user based on the information about the user and the information about the locker availability and by graphically indicating the potential available locker assignments in augmented reality. The method also includes receiving a signal, via the controller, that the user has selected one locker of the potential available locker assignments, and associating, via the controller, the one locker with the user.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example to allow for deviations associated with manufacturing imperfections and associated tolerances.

The present disclosure relates to systems and methods for using a locker system. Specifically, embodiments of the present disclosure present a solution to efficiently assign lockers and provide users with convenient access to assigned lockers. The disclosed techniques may be used in conjunction with augmented reality (AR) headsets worn by users. In specific embodiments, the disclosed techniques may be used in conjunction with mobile devices that provide AR functionality. For example, locker assignments for a locker system having a plurality of lockers may be communicated to users via the AR headsets. In addition, the user is able to unlock/lock the assigned lockers using AR headsets. In one implementation, as a user approaches a locker area, the AR headset receives information from the locker system identifying available lockers (e.g., unused lockers, unused lockers close to the user, unused lockers matching certain criteria or preferences) that may then be processed to assign or suggest one or more lockers to the user. The locker assignment information may be communicated to the user via the AR headset display. Once the user places their belongings into the assigned locker(s), the user may use body gestures (e.g., eye gestures, hand gestures, etc. trackable by the AR headset) to lock the assigned locker(s). Such body gestures may be guided by the display of the AR headset, which may prompt the user to complete the appropriate body gesture, e.g., to mimic a particular pattern of movements. When the user returns to the locker area, the AR headset may direct the user to his or her assigned locker(s) and the user may use the body gestures to unlock the assigned locker(s). Accordingly, the user need not remember the assigned locker number and/or location and may instead rely on the AR headset display to be guided to the correct locker, which in turn facilitates a more carefree experience.

Figure 1:
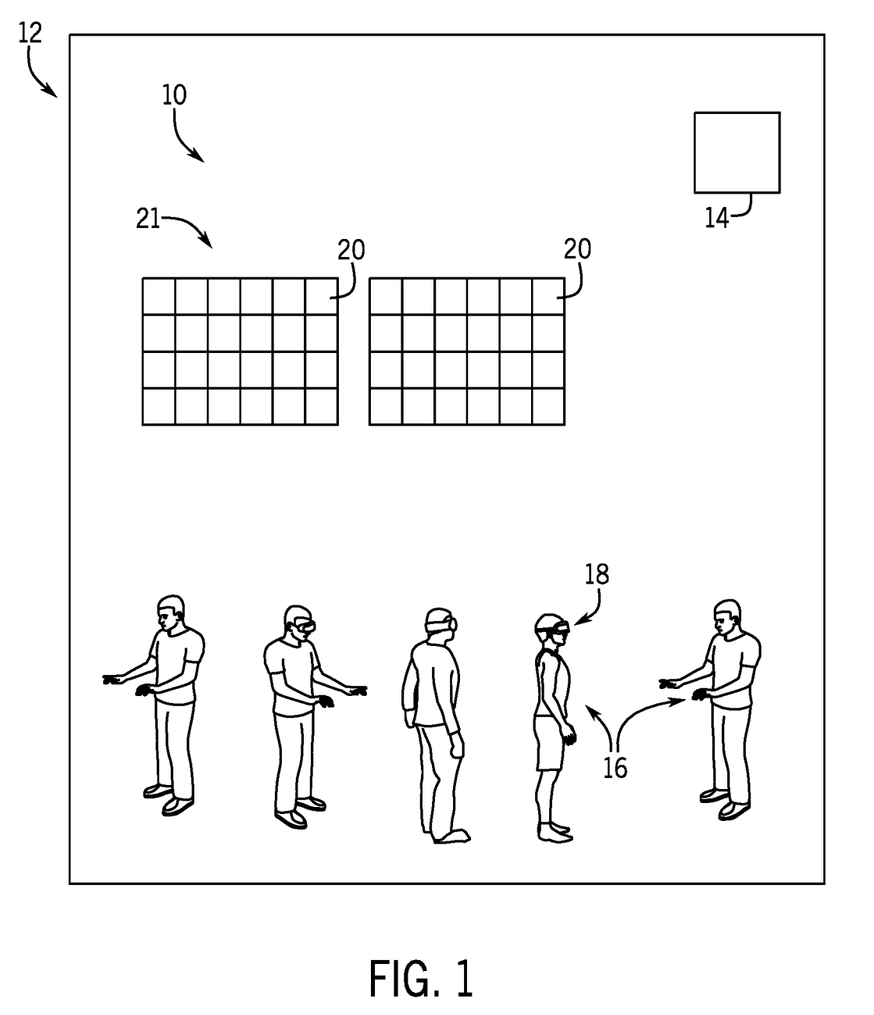
FIG. 1 is a schematic diagram of a facility having a locker system, in accordance with an aspect of the present disclosure.

With the foregoing in mind, to demonstrate various aspects of the present disclosure, the present embodiments are described with respect to a locker system that provides lockers to users (e.g., guests and/or personnel) in an amusement park, entertainment facility, or any other suitable facility. Specifically, embodiments of the present disclosure present a solution to efficiently assign lockers and provide users with convenient access to assigned lockers. Further, embodiments of the present techniques may facilitate payment for lockers or access to lockers that are free for guest use. For example, FIG. 1 is a schematic diagram of a locker system 10 in an amusement park 12, in accordance with an aspect of the present disclosure. As depicted, the amusement park 12 may include a registration area 14, where users 16 (e.g., guests, personnel) may register for admission into the amusement park 12 or admission into one or more attractions in the amusement park 12. In some embodiments, upon registration, some or all of the users 16 may obtain (e.g., rent) augmented reality (AR) headsets 18. For example, the users 16 may wear the AR headsets 18 that may be a part of or enhance the experience at the amusement park 12. In certain embodiments, an individual AR headset 18 may be associated with a particular user 16 as part of registration or receipt of the AR headset 18.

The users 16 may approach the locker system 10 including a plurality of lockers 20 in a locker area 21 to store or retrieve their belongings from one or more of the plurality of lockers 20. As will be discussed below, the users 16 wearing the AR headsets 18 may interact with (e.g., select, return, open/unlock, and close/lock) one or more lockers 20 using the AR headsets 18.

Figure 2:
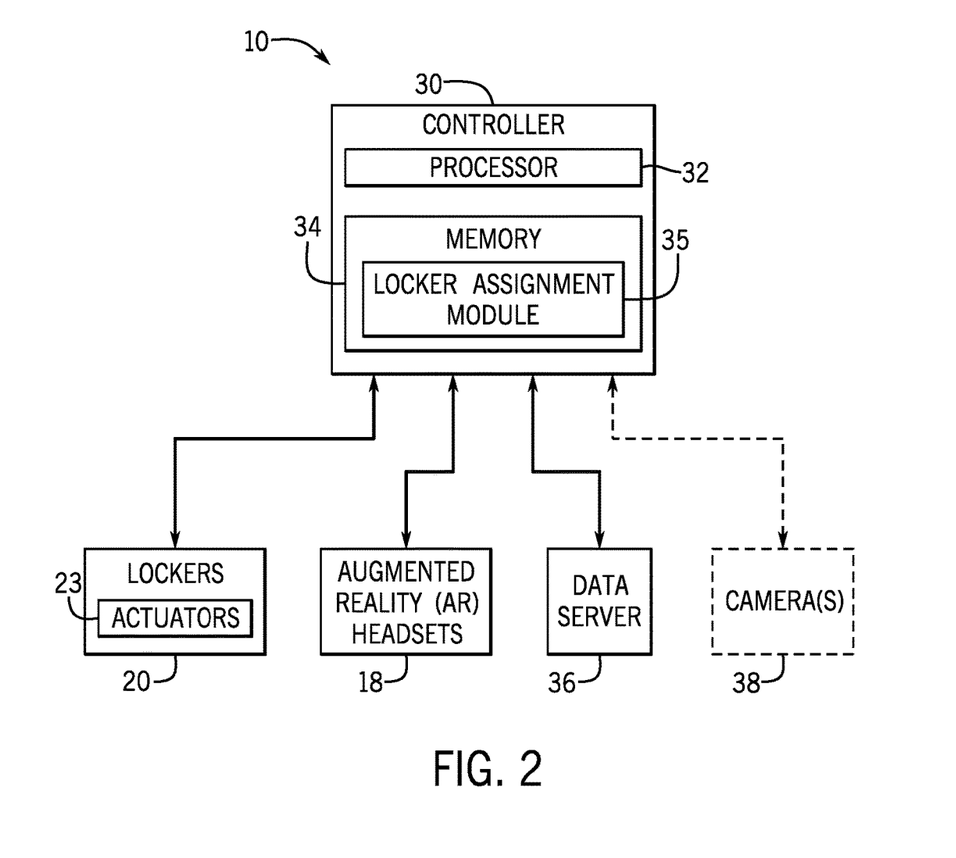
FIG. 2 is a block diagram of the locker system of FIG. 1, in accordance with an aspect of the present disclosure.

An embodiment of a block diagram of the locker system 10 is shown in FIG. 2. As shown, the locker system 10 includes the plurality of lockers 20 and a controller 30 including a processor 32 and a memory 34 (e.g., non-transitory computer-readable medium/memory circuitry) communicatively coupled to the processor 32. The controller 30 may be a dedicated controller for the locker system 10, for an individual attraction, or may be part of a control system of the amusement park 12. The controller 30 is communicatively coupled to the plurality of lockers 20 via wireless or wired communication. In certain embodiments, each individual locker 20 may be configured to communicate with the controller 30. In other embodiments, individual lockers 20 may communicate with a hub or processor-based device that collects availability information for the individual lockers 20 and passes the information to the controller 30. The controller 30 is communicatively coupled to the AR headsets 18 via wireless communication.

Each individual locker 20 may include a locking mechanism, such as a suitable actuator 23 configured to lock/unlock and/or open/close the individual locker 20 upon receiving instructions from the controller 30. In some embodiments, since the controller 30 is communicatively coupled to the lockers 20, the operative condition of the actuators 23 may be communicated to the controller 30, providing availability information for the lockers 20. That is, the controller 30 may receive information about a state of individual actuators 23 (locked or unlocked) and may designate the availability of the associated lockers 20 (available when the actuator 23 is unlocked or unavailable when the actuator 23 is locked) accordingly. The controller 30 is communicatively coupled to a data server 36 via wireless communication. The data server 36 may be a remote or on-site data server that stores and/or processes user information of the users 16. The user information may include any suitable information provided by or authorized by the users 16, such as payment information, membership information, personal information (e.g., age, height, special needs, etc.), locker preference information (e.g., size, number, location of the lockers, etc.). In some embodiments, the locker system 10 may include one or more cameras 38 disposed in the locker area 21, and the controller 30 may be communicatively coupled to the one or more cameras 38 via wired or wireless communication. The one or more cameras 38 may facilitate access control based on recognition (e.g., facial recognition) and may further provide information to the controller 30 to use as input for locker assignment to individual users 16.

Figure 3:
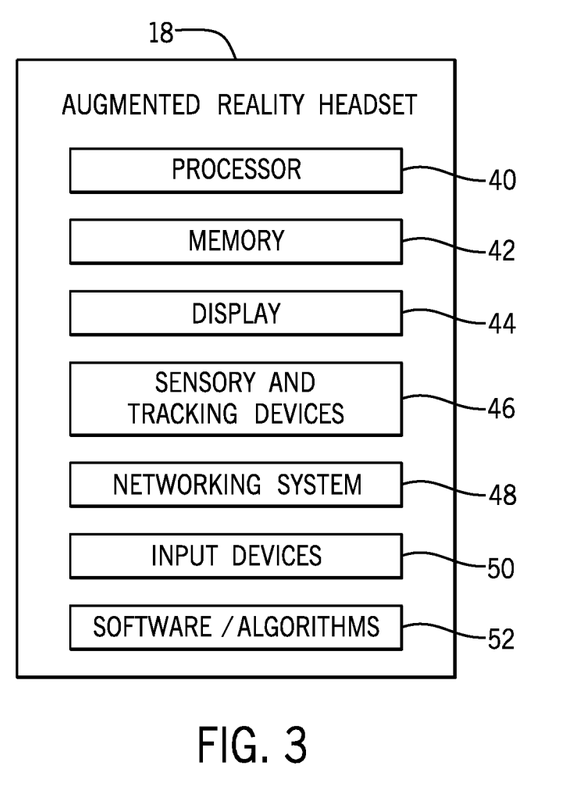
FIG. 3 is a block diagram of the augmented reality headsets of FIG. 2, in accordance with an aspect of the present disclosure.

Each of the AR headsets 18 may provide a live direct or indirect view of a physical, real-world environment whose elements are augmented by computer-generated sensory input such as sound, video, graphics or global positioning system (GPS) data. With the help of the AR headsets 18, the information about the surrounding real world of the users 16 becomes interactive and/or digitally manipulable. The AR headsets 18 may be in any suitable form, such as eyeglasses, head mounted devices, and head-up displays. Each of the AR headsets 18 may include any suitable hardware, software, and algorithms, enabling a suitable AR platform. An embodiment of a block diagram of the AR headset 18 is shown in FIG. 3. The headset 18 may include a processor 40, memory 42 communicatively coupled to the processor 40, a display 44, sensory and tracking devices 46 (e.g., camera, accelerometer, global positioning system or GPS, gyroscope, solid state compass, inertial measurement unit or IMU, etc.), a networking system 48 (e.g., wireless communication system, wired communication, infrared or IR transceiver, optical transceiver), input devices 50 (e.g., speech recognition system, gesture recognition system, etc.), and may be programmed with suitable software/algorithms 52 (e.g., a firmware, an application, an application portability profile or APP, etc.) stored in the memory 42. Further, the memory 42 may store identification information or information that, when accessed by the controller 30, links the AR headset 18 to a stored profile of an individual user 16. In this manner, the AR headset display and locker assignments may be implemented taking user preferences (e.g., a lower locker for a child with limited reach) into account. In other embodiments, the AR headset 18 may be unassociated with a particular user 16.

Coming back to FIG. 2, the memory 34 or the data server 36 may store identification or authorization data, such as a user identification (ID) or user profile information. The memory 34 may store one or more sets of instructions (e.g., processor-executable instructions) and algorithms implemented to perform operations related to function or operation of the locker system 10. For example, the memory 34 may store a locker assignment module 35 including algorithms or rules-based instructions to access, process, and/or analyze information stored in the memory 34 or the data server 36 (e.g., user profile information) as well as signal(s) provided by the lockers 20 (e.g., status indications for the actuators 23), the AR headsets 18, the data server 36, and/or the one or more cameras 38 as inputs to enable a determination of locker assignment for one or more of the users 16. The rules-based instructions may weight certain inputs according to predetermined weighting factors. For example, during more crowded times in the locker area 21, e.g., as assessed via signals from the cameras 38, the weighting may encourage assignment of lockers 20 that are adjacent to other unassigned lockers 20 or that are associated with less user density, to encourage traffic flow into less crowded areas. Accordingly, a weighting factor may include a density of users 16 near an individual locker 20 or a number or density of adjacent available unassigned lockers 20 near an individual locker 20. In another embodiment, the rules-based instructions may weight locker-user distance between the user 16 and an available locker 20 to give higher weight to closer lockers 20 relative to other lockers 20 that are farther from the user.

The locker assignment module 35 may also include instructions to update the locker assignment such that the locker system 10 may keep track of usage of the lockers 20 (e.g., availability, duration of usage, etc.). Accordingly, each individual locker 20 may be configured to communicate information about availability (e.g., occupied or available status) to the controller 30. In one embodiment, the lockers 20 may provide status or availability information upon a change in status (e.g., from occupied to available or vice versa). In another embodiment, the lockers 20 may provide status information at periodic intervals.

The locker assignment module 35 may be configured to efficiently assign lockers 20 to the users 16 according to certain criteria to avoid duplicates and/or overbooked locker assignments. The locker assignment module 35 may process and communicate locker assignments to multiple users 16 simultaneously or substantially simultaneously (e.g., without assigning the same locker 20 to more than one user 16). For example, the locker assignment criteria may include any suitable factors, such as locker availability, user location (e.g., distance to a respective locker), user profile information for a user of an individual AR headset 18 (e.g., age, height, special needs), user preferences (e.g., size, location, number, cost, etc.), user ID, membership status, admission status (e.g., admission to the amusement park 12 and/or certain attraction(s) in the amusement park 12), etc. In one embodiment, if the user 16 is part of a group (e.g., a family group) that is selecting lockers 20, the controller 30 may operate according to a rules-based metric to group assigned lockers 20 for a family adjacent or as close as possible to one another. In another embodiment, the controller 30 may take into account a user location and only assign/indicate availability of one or more lockers 20 that are within a threshold distance (e.g., 3 meters or closer). Further, the controller 30 may combine location and user gaze information (provided by the AR headset 18) to assign/indicate availability of only lockers 20 within a distance threshold and that generally correspond to a forward direction of the gaze of the user 16 in the locker area 21. In another embodiment, a subset of lockers 20 that are within a middle set (e.g., not the highest or lowest rows) may be reserved for users 16 having a special admission status. In another embodiment, when two users 16 enter the locker area 21 at the same time, the controller 30 may facilitate traffic flow within the locker area 21 by directing a first user 16 (via AR arrows or footprints) to a more distant set of lockers 20 than the second user 16. Once the first user 16 is closer to the more distant set of lockers 20, the controller 30 may subsequently highlight one or more available lockers 20 in the more distant set of lockers 20.

In one embodiment, the controller 30 may be programmed to control the function or operation of the AR headsets 18. For example, the controller 30 may store in the memory 34 or access in the data server 36 a model of the locker area 21 that is built using spatial information, e.g., from acquired images of the locker area 21. The model is used, together with other inputs, e.g., from the cameras 38 and sensors 46, to locate each user 16 within the locker area and a direction of gaze for each user 16 from the AR headsets 18, to provide display signals to the AR headset that are dynamically updated as the user 16 moves within the locker area 21. Based on the model, user location and the direction of gaze, the controller 30 may provide overlaid augmented reality images as provided herein.

The memory 34 may also store instructions to obtain or access information relating to availability of the lockers 20 and/or locations/orientations of the users 16, using the sensory and tracking devices 46 of the AR headsets 18. The information obtained by the camera of the sensory and tracking devices 46 may indicate which lockers 20 are available (e.g., lockers 20 that are unlocked and/or open). The information obtained by the accelerometer, GPS, gyroscope, solid state compass, and/or IMU of the sensory and tracking devices 46 may indicate the relative positions/orientations and/or movements of the users 16 with respect to corresponding lockers 20 indicated as available. In some embodiments, the memory 34 may store instructions to obtain the information relating to availability of the lockers 20 and/or locations/orientations of the users 16 as set forth above, using the one or more cameras 38.

For example, the memory 34 may store instructions to operate the displays 44 of the AR headsets 18 to display one or more available and/or suggested lockers 20 to the users 16. The available and/or suggested lockers 20 may be communicated via any suitable visual identifications, including texts, images, or a combination thereof, displayed on the displays 44. For example, the available and/or suggested lockers 20 may be indicated via any suitable visual highlighting (e.g., color shaded, blinking, circling, etc.) such that the visual identification overlaps with the corresponding lockers 20 in the surrounding real world on the displays 44. Navigation (e.g., visual GPS navigation) to the available and/or suggested lockers 20 may also be displayed on the displays 44. Operation options, such as selecting one or more of the available or suggested lockers, locking/unlocking and/or opening/closing assigned lockers 20 may also be displayed on the displays 44. Other suitable communications, such as reminders to retrieve belongings stored in the assigned lockers 20, may also be displayed on the displays 44. Furthermore, the memory 34 may store instructions to display special or themed images on the displays 44 while the users 16 are in the locker area 21.

For example, the memory 34 may store instructions to obtain information from the input devices 50 (e.g., the speech recognition system and/or gesture recognition system) of the AR headsets 18, indicative of locker selections and operations (e.g., locker selection, lock/unlock, and/or open/close) prompted by the users 16. In particular, the users 16 may prompt the locker selections and operations by speech, gaze, hand/arm gesture, etc. For example, the memory 34 may store instructions to operate the actuators 23 such that the controller 30 may lock/unlock and/or open/close the lockers 20.

Figure 4:
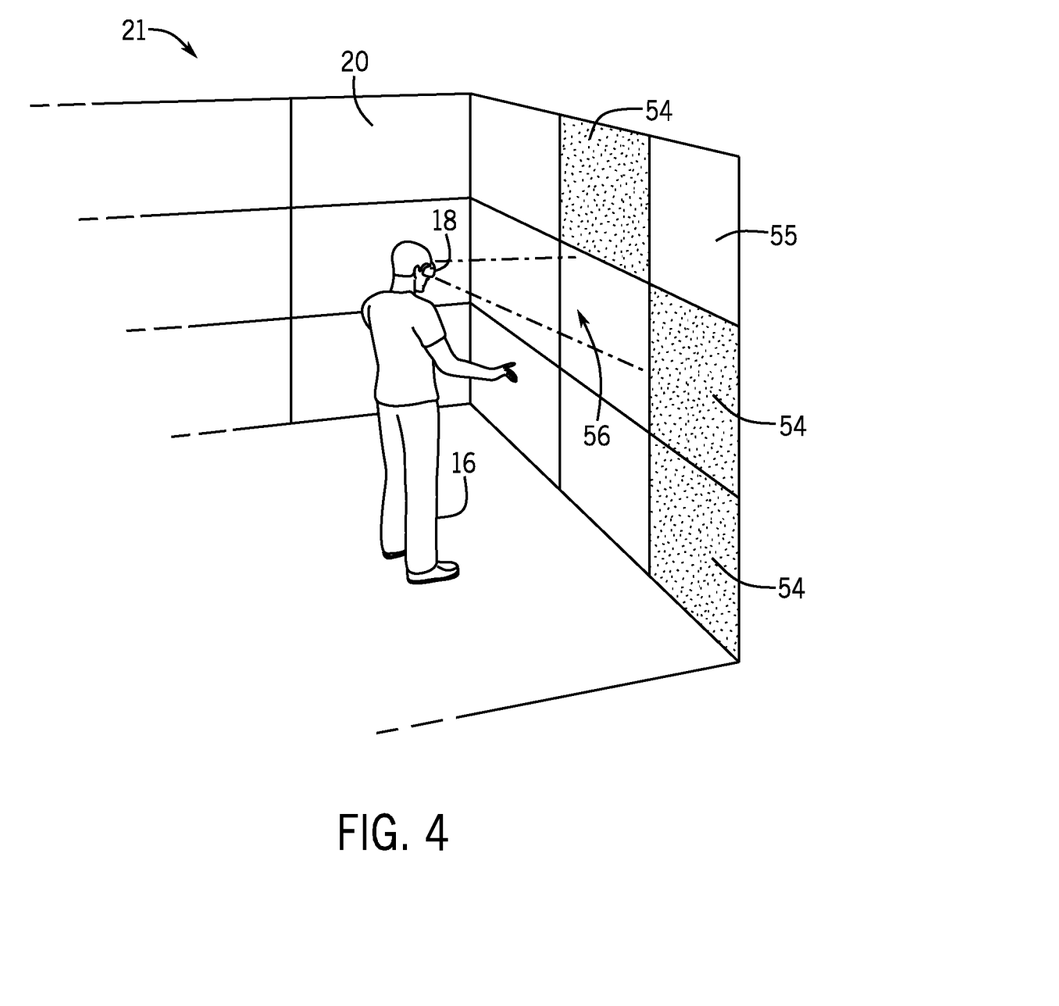
FIG. 4 is a schematic illustration of user interacting with the locker system of FIG. 1 using an augmented reality headset display, in accordance with an aspect of the present disclosure.

FIG. 4 is a schematic illustration of a view of suggested available lockers 54 in a locker area that are presented to the user 16 via the AR headset 18. In the depicted embodiment, a subset of available lockers of the total lockers 20 are presented based on information relating to an estimated gaze field 56 or gaze direction of the user 16. The estimated gaze field 56 may be determined from cameras 38 or feedback from the user's AR headset 18. The system controller 30 may select only available lockers that are within or near the estimated gaze field 56 for presentation to the user 16. The suggested available lockers 54 may be distinguished from unavailable lockers 55 within the estimated gaze field 56 via highlighting, overlaid images, or other display differentiation provided via the AR headset 18. In one embodiment, available lockers 20 are overlaid with a particular color (e.g., green), while unavailable lockers 20 are shown with no overlaid color or with a different color (e.g. red). Available or unavailable lockers 20 may be shown with overlaid text (e.g., "AVAILABLE" or "UNAVAILABLE") or images associated with the ride (e.g., a smiling ride character indicating an available locker 20 and a villainous ride character indicating an unavailable locker 20). In another embodiment, an assigned or available locker is shown with personalized overlaid text, such as the user's 16 name, or a user-associated image, such as the user's stored profile image or profile avatar (accessed from stored user profile information, e.g., via the controller 30) overlaid onto the locker 20. Accordingly, the user 16 can easily spot their assigned locker 20. Further effects may be used to capture user attention (flashing effects, sound effects). In one embodiment, the overlaid image flashes at increasing frequency until the user 16 reaches the assigned locker 20. The overlaid images may also include navigational assistance, such as arrows, footprints, etc., directing the user 16 to the assigned or suggested locker(s) 20. In another example, a ride character may serve as a navigator for the user 16, who follows overlaid images of the character to find the assigned locker 20. Once the user 16 selects a suggested available locker 54, the AR headset 18 may fade or cease displaying any alternate suggested available lockers 54.

While the depicted embodiment shows that the user 16 may be presented with multiple options of suggested available lockers 54, it should be understood that, in other embodiments, the user 16 may be presented with only one suggested or assigned available locker 54. Accordingly, in such an embodiment, while other lockers 20 within the estimated gaze field 56 may be unoccupied, only a single suggested available locker 54 is presented to the user 16. Further, in certain embodiments, regardless of the number of options available to the user 16, the controller 30 may operate such that any individual locker 20 may be shown as available to only one user 16 at a time. In this manner, no two users 16 are competing for the same locker 20.

Figure 5:
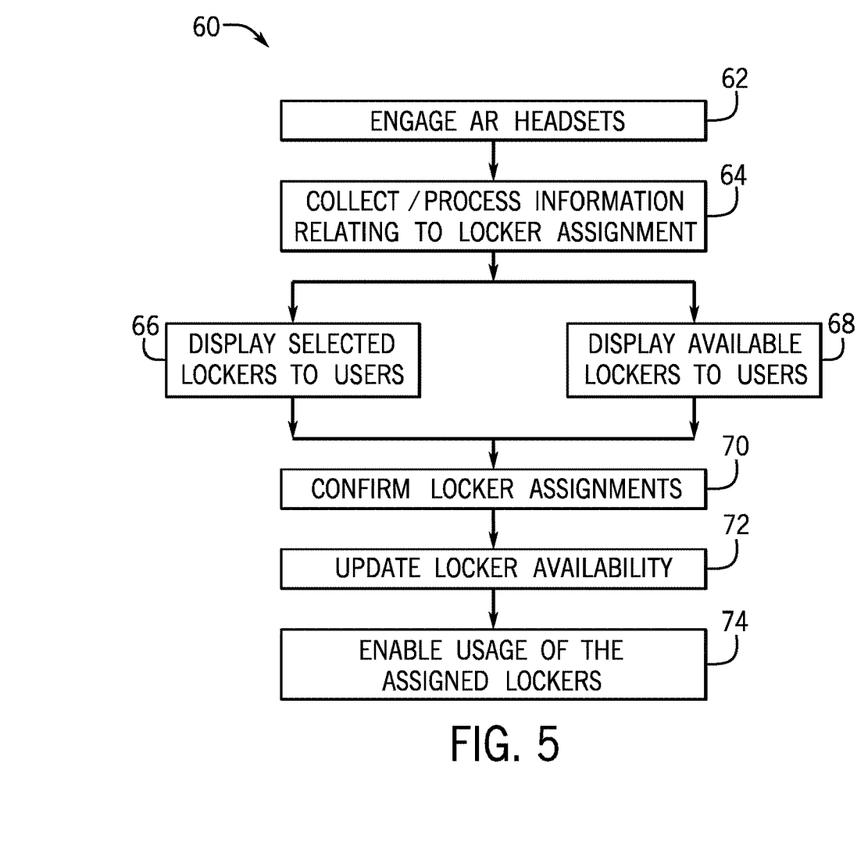
FIG. 5 is a flow chart illustrating a process for utilizing the locker system of FIG. 1 to assign lockers to users and enable users to lock/unlock the assigned lockers using augmented reality headsets, in accordance with an aspect of the present disclosure.

FIG. 5 is a flow chart illustrating a method 60 for utilizing the locker system 10 to assign locker(s) 20 to users 16. One or more steps of the method 60 may be executed by the controller 30 of the locker system 10. The method 60 includes engaging the AR headsets 18 (step 62). The engagement of the AR headset 18 with the locker system 10 may be triggered by a user input indicating the user 16 wishes to access one or more lockers (e.g., the locker(s) 20). For example, the AR headset 18 may display option(s) and/or instruction(s) on the display 44 prompting the user 16 to indicate whether the user 16 wishes to access the lockers 20. In some embodiments, the engagement of the AR headset 18 with the locker system 10 may be triggered automatically when the user 16 receives the AR headset 18 at the registration area 14 or may be automatically triggered when the user 16 is near the locker area (e.g., in close proximity to the locker area 21). Upon receiving the indication that the user 16 wishes to access the lockers 20, the controller 30 may verify identification/status of the user 16 (e.g., the user 16 is in good standing in terms of membership status, admission status, payment method, etc.). For example, the controller 30 may collect relevant information from the data server 36. For example, the controller 30 may verify if the user 16 has made or authorized corresponding payments (e.g., payments associated with renting the lockers 20 or free of charge). Upon passing the verification, the controller 30 may engage the corresponding AR headset 18 with the locker system 10.

The method 60 includes collecting and/or processing information relating to locker assignment (step 64). In particular, the controller 30 may obtain information/data relating to locker assignment (e.g., locker assignment criteria) from the lockers 20, the AR headsets 18, the data server 36, and/or the one or more cameras 38. This information/data may include, but is not limited to, locker availability, user location (e.g., distance to a respective locker), user profile (e.g., age, height, special needs), user preferences (e.g., size, location, number, cost, etc.), user ID, membership status, admission status (e.g., admission to the amusement park 12 and/or certain attraction(s) in the amusement park 12), etc. In particular, the locker assignment module 35 may include instructions executable by the controller 30 to process and analyze the locker assignment criteria to select lockers for the users 16 that most closely fits the assignment criteria based on data about each locker (e.g., stored on the data server 36). For example, the locker assignment module 35 may make a selection from available (e.g., unoccupied, not reserved, etc.) lockers 20. For example, the locker assignment module 35 may include instructions to determine that the user 16 is closer to certain lockers 20 and make selection from the relatively closer lockers 20. For example, the locker assignment module 35 may include instructions that assign lockers 20 based on the user's height and/or special needs. In another example, the locker assignment module 35 may determine that the user 16 is authorized to certain lockers 20 available for selective membership status, and make selection from those lockers 20. For example, the locker assignment module 35 may include instructions to determine that the user 16 is authorized to use certain lockers 20 associated with selective attraction(s) in the amusement park 12.

The method 60 may include displaying selected lockers 20 to the users 16 (step 66). Upon completion of the locker selection process/analysis set forth above, the controller 30 may instruct the AR headset 18 to display the selected locker(s) 20 using the display 44. Specifically, the locker(s) 20 shown to the user 16 in the step 66 is the selection made by the locker system 10, and the user 16 may accept or deny the selection and/or choose one or more lockers 20 from the available options selected by the locker system 10. In some embodiments, the method 60 may include displaying available lockers 20 to the users 16 (step 68). For example, upon completion of the locker selection process/analysis set forth above, the controller 30 may instruct the AR headset 18 to display all available locker(s) 20, instead of selected locker(s) 20, using the display 44. Specifically, the available lockers 20 may be shown to the user 16 (step 68), along with instructions prompting the user 16 to make a selection. In some embodiments, displaying selected lockers 20 (step 66) or available lockers (step 68) includes displaying navigation routes to the selected or available locker(s) 20 on the display 44.

The method 60 may include confirming locker assignments (step 70). For example, the controller 30, which is communicatively coupled to the AR headsets 18, may receive input from the user 16 to confirm their locker selection. For example, subsequent to the step 66, the user 16 may accept or deny the locker selection made by the locker system 10 using the input devices 50 (e.g., the speech recognition system and/or gesture recognition system) of the AR headsets 18. For example, subsequent to the step 68, the user 16 may select one or more lockers 20 from the available lockers 20 identified by the locker system 10, using the input devices 50 (e.g., the speech recognition system and/or gesture recognition system) of the AR headsets 18. The method 60 may include updating locker availability (step 72). Once the users 16 have confirmed their selection in step 70, the controller 30 updates the locker availability to avoid duplicates and/or overbooked locker assignment or indications of availability.

The method 60 may include enabling usage of the assigned lockers 20 (step 74) upon confirmation of the locker assignment (step 72). For example, the controller 30 may receive instructions from the input devices 50 (e.g., the speech recognition system and/or gesture recognition system) of the AR headsets 18, and based on the received instructions, the controller 30 may send instructions to the actuators 23 to unlock or open the confirmed assigned locker(s) 20. For example, the controller 30 may collect information from the actuators 23, the AR headset 18, the camera(s) 38, or a combination thereof, to determine that the user's belongings have been positioned in the respective locker(s) 20, and subsequently the controller 30 may send instructions to the actuators 23 to close and/or lock the respective locker(s) 20.

Figure 6:
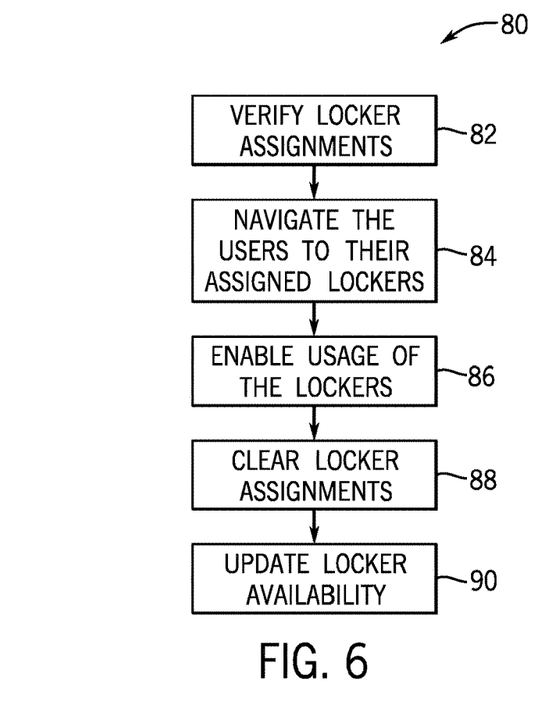
FIG. 6 is a flow chart illustrating a process for guiding users to an assigned locker of the locker system of FIG. 1, in accordance with an aspect of the present disclosure.

FIG. 6 is a flow chart illustrating a method 80 for utilizing the locker system 10 to assist the users 16 in accessing their respective locker(s) 20 (e.g., lockers that have been assigned to the users 16). One or more steps of the method 80 may be executed by the controller 30 of the locker system 10. The method 80 includes verifying locker assignment (step 82). The locker assignment verification step may be triggered by a user input indicating the user 16 wishes to access the respective assigned locker 20. For example, the user 16 may use the input devices 50 (e.g., the speech recognition system and/or gesture recognition system) of the AR headsets 18 to indicate a request to access the respective assigned locker 20. In some embodiments, this step may be triggered automatically when the user 16 wearing the AR headset 18 is near the locker area 21 (e.g., in close proximity to the locker area 21). Upon receiving the indication that the user 16 wishes to access the respective assigned locker 20, the controller 30 may verify identification/status of the user 16 (e.g., the user 16 is in good standing and is currently renting the respective locker 20) to verify the locker assignment.

Figure 7:
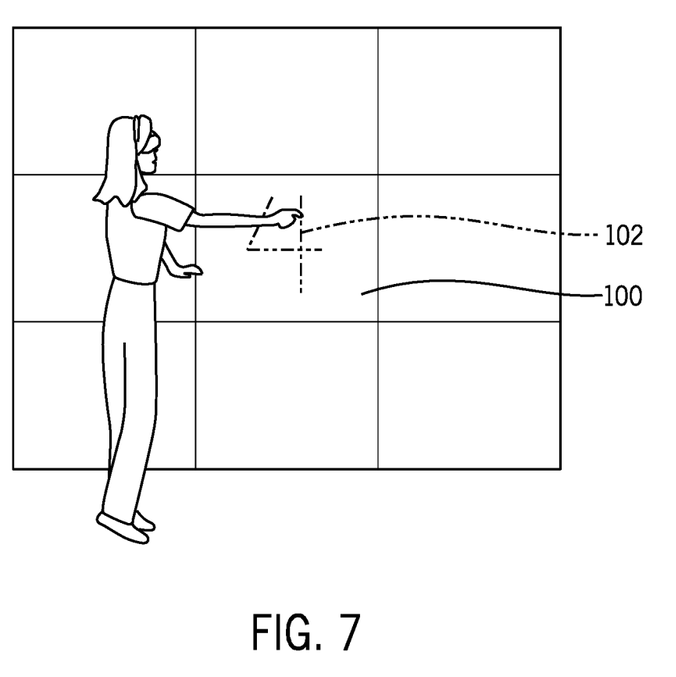
FIG. 7 is a schematic illustration of a user interacting with the locker system of FIG. 1 using a gesture-based locking or unlocking technique in accordance with an aspect of the present disclosure.

In other embodiments, as shown in FIG. 7, the locking/unlocking of the user's assigned locker 100 may be based on a gesture recognition input that is generated by the user 16 and sensed by the AR headset 18 or the one or more cameras 38. For example, the user 16 may be prompted via the display of the AR headset 18 to mimic a displayed symbol 102 (shown as a number "4" in FIG. 7 by way of example only). In other embodiments, the user 16 may be prompted to create a unique gesture. Upon detecting the appropriate gesture, the AR headset 18 may send a signal to the controller 30 to lock/unlock the user's assigned locker 100. In one embodiment, the gesture to lock and subsequently unlock the user's assigned locker 100 is the same.

Turning back to FIG. 6, the method 80 may include navigating the users 16 to their assigned lockers 20 (step 84). In particular, the controller 30 may instruct the AR headset 18 to display the assigned locker 20 and/or display navigation (e.g., visual GPS navigation) to the assigned locker 20. The method 80 may include enabling usage of the assigned lockers 20 (step 86). For example, the controller 30 may send instructions to the actuators 23 to unlock and/or open the assigned locker(s) 20. For example, the controller 30 may receive instructions from the input device(s) 50 (e.g., the speech recognition system and/or gesture recognition system) of the AR headsets 18, and based on the received instructions, the controller 30 may instruct the actuators 23 to unlock and/or open the assigned locker(s).

The method 80 may include clearing the locker assignments (step 88) and updating the locker availability (step 90). These steps may be triggered by indication that the user 16 wishes to clear the locker assignment. For example, the controller 30 may receive input from the input device(s) 50 (e.g., the speech recognition system and/or gesture recognition system) of the AR headsets 18, indicating the user 16 no longer needs the locker 20 (e.g., the user 16 wishes to clear the locker assignment).

In some embodiments, the controller 30 may collect information from the actuators 23, the AR headset 18, the data server 36, the one or more camera(s) 38, or a combination thereof, and based on the collected information determining that the user 16 no longer needs the locker 20. For example, the controller 30 may collect information from the AR headset 18 and/or the one or more camera(s) 38 to determine that the user 16 has retrieved the belongings and is heading to the exit of the attraction and/or the amusement park 12. In some embodiments, sensors (e.g., optical or weight sensors) may detect the presence of items in the locker 20 to facilitate this. Subsequently, the controller 30 may clear the locker assignment (step 88) and update locker availability (step 90) such that the respective locker 20 is available for the next locker assignment.

It should be appreciated that while aspects of the the locker system 10 are discussed as implemented using the AR headsets 18, embodiments of the present disclosure may also be implemented using any other suitable mobile devices (e.g., mobile phones, smartphones, tablets). For example, the mobile devices may have functionalities similar to the AR headsets 18 (e.g., functionalities implemented by hardware and software, such as a process, memory, display, sensory and tracking devices, a networking system, input devices, a firmware, an application, an application portability profile or APP, etc.). In one example, rather than viewed augmented reality images via a headset display 44, the augmented reality images may be viewed on a mobile or personal device display. For example, the user 16 may download an APP to his or her mobile device to connect the mobile device to the locker system 10, the controller 30, etc. Subsequently, the locker system 10 may efficiently assign lockers and provide the user 16 with convenient access to assigned lockers 20 in the same manner as set forth above.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A locker system, comprising:
   a locker area;
   a plurality of lockers positioned in the locker area;
   a plurality of augmented reality headsets, individual augmented headsets of the plurality of augmented reality headsets including a display and being configured to be worn by respective individual users; and
   a controller communicatively coupled to the plurality of lockers and the plurality of augmented reality headsets, wherein the controller comprises a memory and a processor configured to execute instructions stored on the memory comprising instructions for:
   generating locker assignments to assign individual lockers of the plurality of lockers to the respective individual users;
   communicating the locker assignments of the assigned individual lockers to the respective individual users using the plurality of augmented reality headsets; and
   controlling operation of the assigned individual lockers of the plurality of lockers based on signals received from the plurality of augmented reality headsets of the respective individual users, wherein the signals are indicative of commands provided by the respective individual users and wherein the commands are sensed using the plurality of augmented reality headsets.

2. The locker system of claim 1, comprising one or more cameras configured to surveil the locker area, wherein generating the locker assignments is based on information received via the plurality of augmented reality headsets, the one or more cameras, or a combination thereof.

3. The locker system of claim 1, wherein generating the locker assignments is based on locker availability, user location, user profile, user preferences, user identification, membership status, admission status, or a combination thereof.

4. The locker system of claim 1, wherein a particular assigned individual locker is indicated on the display of an individual augmented reality headset with an indicator positioned to correspond to an actual view of the particular assigned individual locker.

5. The locker system of claim 1, wherein controlling the operation of the assigned individual lockers comprises locking and unlocking the assigned individual lockers.

6. The locker system of claim 1, wherein the instructions comprise displaying navigation to the assigned individual lockers on the displays of the respective augmented reality headsets.

7. The locker system of claim 1, comprising generating the signals with the plurality of augmented reality headsets based on information from gesture recognition systems of the augmented reality headsets.

8. The locker system of claim 1, wherein the instructions comprise updating availabilities of the plurality of lockers based on the locker assignments.

9. A system comprising:
   a locker area;
   a plurality of lockers positioned in the locker area;
   a plurality of augmented reality headsets; and
   a controller communicatively coupled to the plurality of lockers and the plurality of augmented reality headsets, wherein the controller is configured to determine assignments of the plurality of lockers based on one or more criteria and communicate the assignments to the respective plurality of augmented reality headsets, wherein the assigned lockers of the plurality of lockers are configured to be locked and unlocked in response to instructions provided via the respective plurality of augmented reality headsets.

10. The system of claim 9, wherein the one or more criteria comprise information collected using the plurality of augmented reality headsets.

11. The system of claim 9, comprising one or more camera disposed in the locker area, wherein the one or more criteria comprise information collected using the one or more camera.

12. The system of claim 9, wherein the one or more criteria comprise distances between the plurality of lockers and the plurality of augmented reality headsets.

13. The system of claim 9, wherein each of the respective plurality of augmented reality headsets includes a display and the assigned lockers are indicated on the displays.

14. The system of claim 9, wherein the instructions are provided using gesture recognition systems of the respective plurality of augmented reality headsets.

15. A method of using a locker system, comprising:
   receiving, via a controller, information from an augmented reality headset, wherein the information is about a user of the augmented reality headset in a locker area comprising a plurality of lockers;
   accessing information from sensors, via the controller, the information being indicative of locker availability of the plurality of lockers;
   communicating potential available locker assignments from the controller to the augmented reality headset worn by the user based on the information about the user and the information about the locker availability and by graphically indicating the potential available locker assignments in augmented reality;

receiving a signal, via the controller, that the user has selected one locker of the potential available locker assignments; and associating, via the controller, the one locker with the user.

16. The method of claim 15, wherein the information about the user comprises user location in the locker area and a direction of gaze of the user.

17. The method of claim 15, comprising displaying highlights or overlays of the potential available locker assignments on a display of the augmented reality headset.

18. The method of claim 15, wherein the signal that the user has selected the one locker comprises one or more signals provided by a gesture recognition system of the augmented reality headset.

19. The method of claim 15, comprising collecting the information about the user from one or more cameras disposed in the one or more locker areas.

20. The method of claim 15, wherein the information about the user comprises user profile information, user preference information, user identification, membership status, admission status, or a combination thereof from a data server.

* * * * *